Feb. 15, 1927.

E. C. RENAUD 1,617,458

AUTOMOBILE STEERING MECHANISM

Filed Nov. 12, 1923

Witness!
R. E. Hamilton

INVENTOR.
Edwin C. Renaud
BY
Warren D. House
His ATTORNEY.

Feb. 15, 1927.
E. C. RENAUD
1,617,458
AUTOMOBILE STEERING MECHANISM
Filed Nov. 12, 1923   2 Sheets-Sheet 2
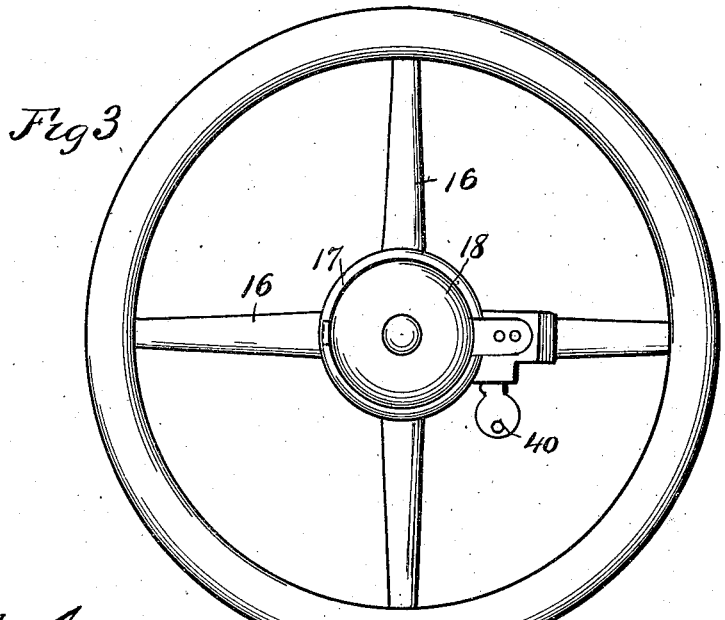
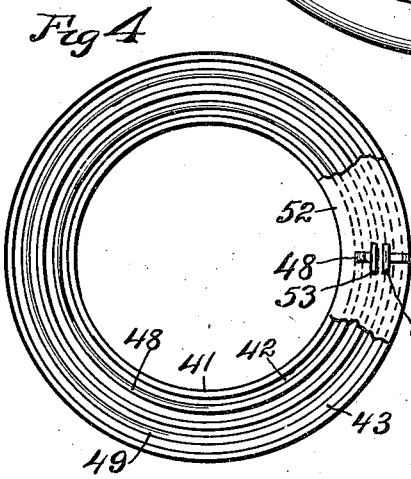
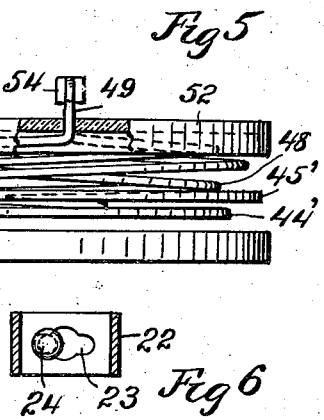
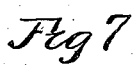
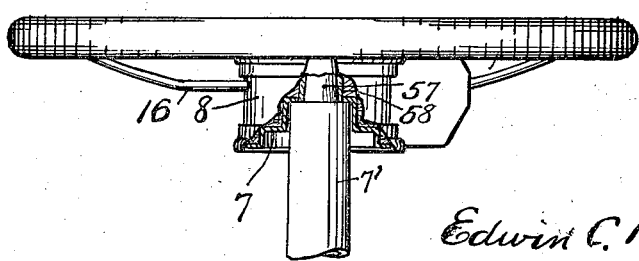
INVENTOR.
Edwin C. Renaud
BY Warren D. House
His ATTORNEY.
Witness:
R. E. Hamilton Patented Feb. 15, 1927.

1,617,458

UNITED STATES PATENT OFFICE.

EDWIN C. RENAUD, OF ST. JOSEPH, MISSOURI.

AUTOMOBILE STEERING MECHANISM.

Application filed November 12, 1923. Serial No. 674,367.

My invention relates to improvements in automobile steering mechanisms. It relates particularly to novel means for releasably locking a steering member, such as a steering wheel, to the steering post of an automobile, whereby, when the steering member is not locked to the steering post, unauthorized steering of the automobile by use of the steering post may be prevented.

A further object of my invention is to provide novel means for preventing unauthorized access to the upper end of the steering post in a structure embodying a steering member arranged to have releasable locked engagement with the steering post.

My invention provides further novel means for locking a steering member to a hub member adapted to be secured to a steering post of an automobile.

My invention provides still further novel means for controlling the ignition circuit of an automobile, whereby unauthorized use of the automobile in the usual manner may be prevented.

My invention also has for its object the provision of a reversible steering member adapted to be used in connection with a hub member secured to the steering post, combined with means for releasably locking said members together, whereby the apparatus may be adapted for types of automobiles in which the spokes of the steering wheel incline either upwardly or downwardly.

My invention provides further an automobile mechanism which is simple, cheap to make, durable, not liable to get out of order, and which is efficient in operation.

The novel features of my invention are hereinafter fully described and claimed.

In the accompanying drawings, which illustrate the preferred embodiment of my invention—

Fig. 3 is a reduced plan view of the mechanism.

Fig. 4 is a plan view, broken away, of the two insulating rings and parts connected therewith, the two contacts of the ignition circuit being shown separated.

Fig. 5 is a view, partly in elevation and partly in vertical section of what is shown in Fig. 4.

Fig. 6 is a section on the line 6—6 of Fig. 1.

Fig. 7 is an elevation, partly broken away, showing my improved steering mechanism applied to a steering post having a tapering upper portion, and the steering wheel being disposed in the position reverse to its position in Fig. 1.

Similar reference characters designate similar parts in the different views.

Figure 1:
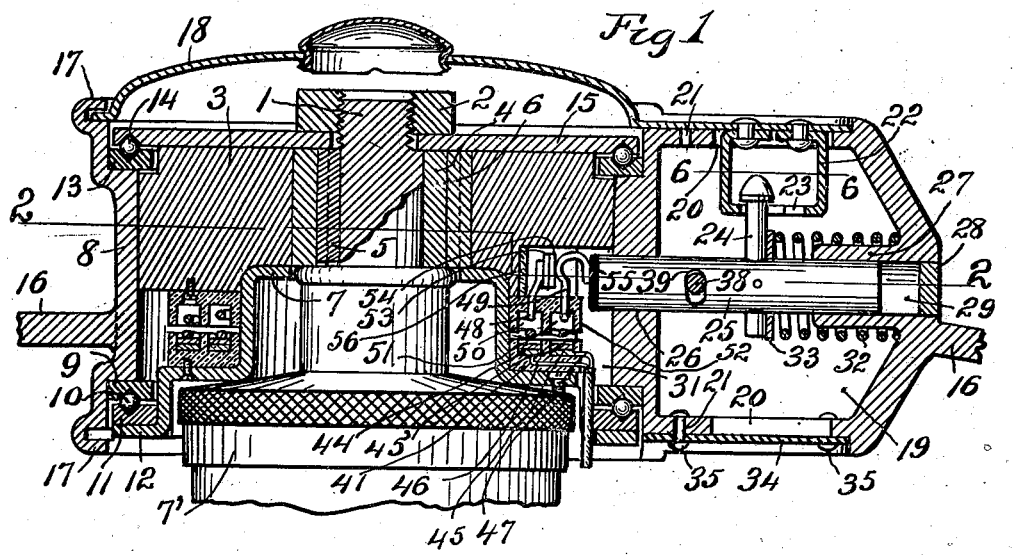
Fig. 1 is a central vertical sectional view, partly broken away, of my improved steering mechanism, shown applied to a steering post of an automobile, the steering member being shown in the position in which the spokes of the steering wheel incline downwardly, and the bolt being shown in the locked position.

Referring particularly to Fig. 1 to Fig. 6, 1 designates a steering post having a cylindrical upper end which is screw threaded and has fitted thereon the usual nut 2.

My improved steering mechanism is provided with a hub member 3 through which the steering post 1 extends, and which fits over a sleeve 4, which fits the cylindrical upper end of the steering post 1 to which it is held from turning by a key 5. A key 6 is disposed between the sleeve 4 and the hub member 3. The hub member 3 rests on an inverted cup shaped member 7 encircling the post 1 and which rests upon and is secured to the steering post casing 7'. A steering member, such as a steering wheel, has a central circular portion 8 in the lower end of which is mounted a ring bearing member 9 having a ball race in which are mounted bearing balls 10 which run in a race provided in a bearing ring 11, the latter being mounted upon an annular peripheral flange 12 of the member 7.

In the upper end of the circular portion 8 is mounted a bearing ring member 13 having a race in which run balls 14 which are disposed in a race provided in a ring bearing member 15, which rests on the hub member 3 and the sleeve 4 and through which extends the upper end of the steering post 1. The nut 2 bears against the upper side of the bearing member 15. The hub member 3 and steering wheel 8 have co-operating fitting means by which the steering wheel is adapted to be reversed from the position in which the spokes 16 thereof extending downwardly, as shown in Fig. 1 to the position shown in Fig. 7, in which the spokes 16 incline upwardly, thus accommodating the mechanism to the two types of automobiles in which the spokes incline respectively upwardly and downwardly to permit convenient access to the hand operated levers carried on the steering post casing.

The steering member is revoluble around the hub member 3, when it is desired to render the steering mechanism inoperative for steering the machine, for preventing theft or unauthorized use of the machine.

The upper and lower ends of the circular portion 8 of the steering member are alike in structure, and are each provided with an arcuate lip 17 under which is adapted to be inserted the periphery of a substantially circular cap 18, which is adapted to cover the upper end of the steering post 1 and the nut 2, for preventing unauthorized removal of the nut, or access to the steering post for the purpose of manipulating the latter.

The steering wheel at one side of the circular portion 8 is provided with a chamber 19 the top and bottom of which are respectively provided with openings 20 and rivet holes 21. Attached to the cap 18 at the under side thereof, is a bracket 22 which extends through the uppermost opening 20, and which in its lower end has a radial slot 23, Fig. 6, through which normally extends a pin 24 having at its upper end a head, the pin being mounted transversely in and secured to a radial locking member, which may comprise a slidable bolt 25, mounted in a radial hole 26 provided in the circular portion 8 midway between the upper and lower ends thereof. The bolt 25 is mounted in the chamber 19 which is provided with an inwardly extending radial tubular boss 27, the outer end of which is normally closed by a plug 28 having a lateral notch 29 in which is fitted the adjacent end of the bolt 25, the latter having a notch 30 in which is fitted the inner end of the plug 28, whereby the bolt is held from revolving axially.

Figure 2:
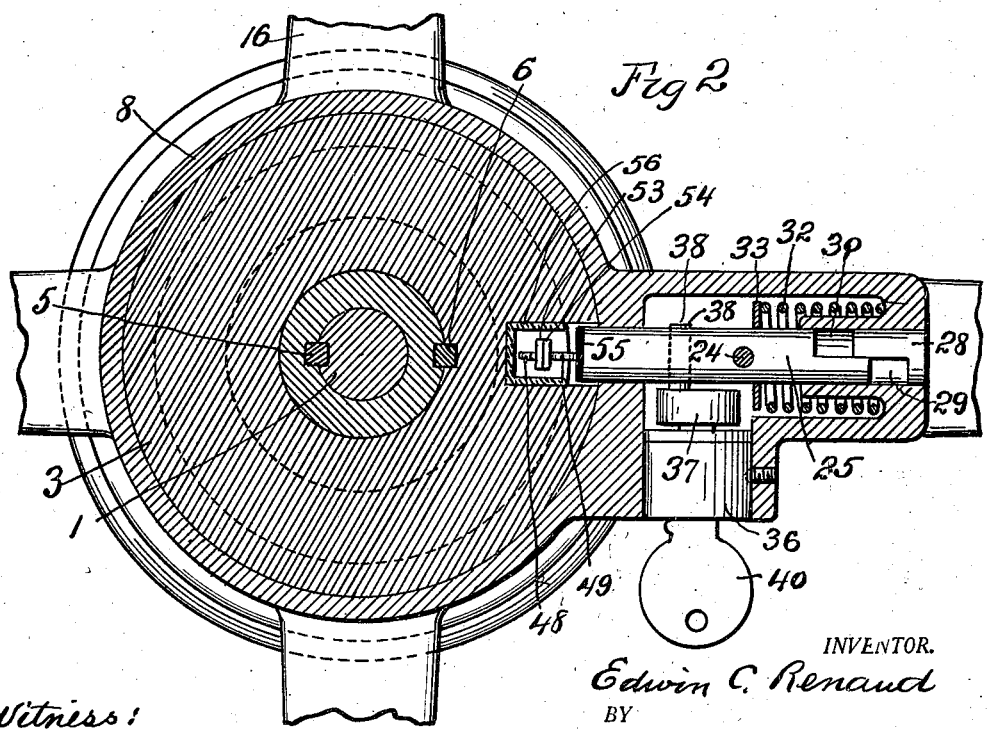
Fig. 2 is a sectional view on the line 2—2 of Fig. 1, the bolt and some other parts being shown in plan.

The bolt 25 is adapted to enter a chamber 31 provided in the hub member 3, as shown in Figs. 1 and 2, whereby the steering member is adapted to be held from revolving relatively to the hub member 3, when it is desired to steer the machine.

A coil spring 32 encircles the boss 27, and bears at its outer end against the inner wall of the chamber 19. The inner end of the spring 32 bears against a washer 33 on the bolt 25, the washer having a bearing against the pin 24. The tension of the spring 32 normally forces the bolt 25 to the locking position shown in Figs. 1 and 2.

The slot 23 is constricted at its ends so as to prevent the passage therethrough of the head of the pin 24 when the bolt 25 is either in the locked or unlocked position. The central portion of the slot 23 is enlarged to permit the head of the pin 24 passing through, when the bolt 25 is in the intermediate position, in which position, the bracket 22 is released from the pin 24, and the cap 18 may be removed from the steering member.

A plate 34 normally covers the opening 20 which at the time is at the lower side of the steering member, the plate being fastened to the walls of the chamber 19 by rivets 35 mounted in the holes 21 adjacent to the plate.

For sliding the bolt 25 from the locking position shown in Figs. 1 and 2 to release the steering member from the hub member, suitable means may be provided, preferably key operated means, comprising a lock having a casing 36 mounted in the wall of the chamber 19, and a rotary key operated member 37 mounted in the casing 36, and which is provided with an eccentric arm 38 which extends into a transverse hole 39 provided in the bolt 25. The member 37 is operated by the usual key 40, the latter being adapted to turn the member 37 so as to force the bolt 25 from the locking position against the pressure of the retracting spring 32. When the key is turned to a position in which the bolt 25 is in the intermediate position, the head of the pin 24 will aline with the enlarged portion of the slot 23, thus permitting the cap 18 to be removed, which can not be removed without the use of the key.

After the key 40 has unlocked the bolt 25, the arm 38 will be in a position diametrically opposite that shown in Fig. 2, thereby holding the bolt disengaged from the hub member 3, so that the steering member will freely revolve on the hub member, thus preventing unauthorized use of the machine in connection with the steering mechanism.

In order that the ignition circuit of the machine or other desired circuit of the machine may be made inoperative for its purpose, when the steering member is unlocked from the hub member, the following described mechanism may be provided.

Encircling the member 7 and resting on it is a ring 41 of insulating material provided in its upper side with two concentric channels 42 and 43 in which are respectively mounted two metal contact rings 44 and 45 which have a sliding bearing against two metal contact rings 44' and 45'. Respectively connected conductively to the rings 44 and 45 are two conductors 46 and 47, which are included in a circuit, such as the ignition circuit of the machine.

The rings 44' and 45' are respectively connected conductively to two helical conductors 48 and 49 disposed respectively in two concentric channels 50 and 51 provided in the under side of an insulating ring 52 above the ring 41, encircling the member 7, and securely attached to the hub member 3 so as to rotate therewith.

The conductors 48 and 49 extend through the top of the ring 52, are resilient, and are provided with two normally separated contacts 53 and 54. The conductor 49 is in the path of movement of the bolt 25. The latter has at its inner end a tip 55 of insulating material, which, when the bolt 25 is in the locking position, shown in Figs. 1 and 2 bears against the conductor 49 so as to hold the contact 54 against the contact 53, thus closing the circuit at this point, when the steering member 8 is locked to the hub member 3 by the bolt 25. The machine may then be steered and the engine operated in the usual manner.

To render the machine inoperative, the operator turns the key 40 so that the arm 38 is disposed diametrically opposite from the position shown in Fig. 1 and Fig. 2, thereby withdrawing the bolt 25 from the chamber 31 and out of engagement with the hub member 3. The tension of the spring conductors 48 and 49 will force the contacts 53 and 54 apart, thus breaking the circuit. The key 40 is then withdrawn from the lock casing 36. The steering member may now be revolved without effecting any turning of the steering post 1.

If it is desired to remove the cap 18, the key 40 is inserted in the lock casing and turned to the intermediate position. The pin 24 will then be in the intermediate position with respect to the slot 23, so that the cap 18 may be lifted at its bracket end out of the adjacent opening 20. The cap may then be withdrawn from the adjacent lip 17. Access may then be had to the nut 2.

When the steering wheel is to be used with the spokes 16 inclining upwardly, as shown in Fig. 7, the steering member 8 is reversed, the former bottom side now being the top side. The plate 34 is detached and fastened to the steering member over the other opening 20. The cap 18 and pin 24 are then mounted in the manner already described. The position of the bolt 25 in the middle position between the bearing rings 9 and 13, and midway between the upper and lower ends of the circular portion 8 of the steering wheel, permits of the reversal of the steering member without changing the relationship of the bolt 25 with relation to the hub member 3 and the conductors 48 and 49.

To prevent possible contact of the latter with the hub member 3, there is mounted in the chamber 31 on the insulating ring 52 a U-shaped insulating member 56, Figs. 1 and 2, between the arms of which are disposed the contacts 53 and 54.

In Fig. 7 is shown my improved mechanism mounted on a steering post having a conical upper portion 57, on which is fitted a sleeve 58, corresponding in function, position and outside diameter to the sleeve 4, but having a conical bore to fit the conical portion 57 of the steering post. In all other respects the parts are the same in form position and function as hereinbefore described.

To prevent the conductors 46 and 47 from being tampered with, these conductors may be passed downwardly through the steering post casing, or covered in any suitable manner.

I do not limit my invention to the structure shown and described, as many modifications, within the scope of the appended claims, may be made without departing from the spirit of my invention.

What I claim is:—

1. In an automobile steering mechanism, a hub member, means adapted to be fitted on an automobile steering post for locking said member to said post, a steering member, the latter and said hub having co-operating fitting means by which said steering member is revoluble on and adapted to be reversed in position upon said hub member, and releasable means for locking said members together with the steering member in either of the positions.

2. In an automobile steering mechanism, a hub member, a sleeve adapted to be fitted on a steering post of an automobile, means for locking the sleeve to the post and to the hub member, a steering member, the latter and said hub having co-operating fitting means by which said steering member is revoluble on and adapted to be reversed in position on said hub member, and releasable means for locking said members together with the steering member in either of the positions.

3. In an automobile steering mechanism, a hub member, means adapted to be fitted on an automobile steering post for locking said member to said post, a steering member, the latter and said hub having co-operating fitting means by which said steering member is revoluble on and adapted to be reversed in position upon said hub member, a locking member movable to two positions in one of which it will lock said hub member and said steering member together, with the steering member in either of the positions and key operated means for moving said locking member to one of said two positions.

4. In an automobile steering mechanism, a hub member, means adapted to be fitted on an automobile steering post for locking said member to said post, a steering member, the latter and said hub having co-operating fitting means by which said steering member is revoluble on and adapted to be reversed in position upon said hub member, circuit controlling means, and releasable means for locking said members together arranged to operate said controlling means with the steering member in either of the positions.

5. In an automobile steering mechanism, a hub member, means adapted to be fitted on an automobile steering post for locking said member to said post, a steering member, the latter and said hub having co-operating fitting means by which said steering member is revoluble on and adapted to be reversed in position upon said hub member, automobile ignition circuit controlling means, and releasable means for locking said members together arranged to operate said controlling means with the steering member in either of the positions.

6. In an automobile steering mechanism, a hub member, means adapted to be fitted on an automobile steering post for locking said member to said post, a steering member, the latter and said hub having co-operating fitting means by which said steering member is revoluble on and adapted to be reversed in position upon said hub member, a locking member for locking said hub member and said steering member together, with the steering member in either of the positions, a cap adapted to cover the upper end of said steering post, and cap locking means actuated by said locking member for locking said cap to said steering member when the locking member is in either the locking or unlocked position and arranged to release said cap when the locking member is in a position intermediate of the locking and unlocked positions.

7. In an automobile steering mechansm, a hub member, means adapted to be fitted on an automobile steering post for locking said member to said post, a steering member revoluble on said hub member, a locking member movable to and from a position in which it will lock the steering member to said hub member, a cap adapted to cover the upper end of the steering post and provided with a slot, a pin carried by the locking member and extending through said slot and having a head adapted to engage and hold the cap locked to said steering member when the locking member is in either the locked or unlocked position, said head being released from said cap when the locking member is in a position intermediate of the locking and unlocked positions, and ignition circuit controlling means operable by said locking member.

In testimony whereof I have signed my name to this specification.

EDWIN C. RENAUD.